(12) United States Patent
Hirashita et al.

(10) Patent No.: US 11,287,030 B2
(45) Date of Patent: Mar. 29, 2022

(54) SHIFT DEVICE

(71) Applicant: KABUSHIKI KAISHA TOKAI-RIKA-DENKI-SEISAKUSHO, Aichi (JP)

(72) Inventors: Takahiro Hirashita, Aichi (JP); Hiroki Ono, Aichi (JP); Masayoshi Iwata, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/646,236

(22) PCT Filed: Aug. 28, 2018

(86) PCT No.: PCT/JP2018/031782
§ 371 (c)(1),
(2) Date: Mar. 11, 2020

(87) PCT Pub. No.: WO2019/054172
PCT Pub. Date: Mar. 21, 2019

(65) Prior Publication Data
US 2020/0271219 A1 Aug. 27, 2020

(30) Foreign Application Priority Data
Sep. 13, 2017 (JP) .............................. JP2017-175427

(51) Int. Cl.
*F16H 59/04* (2006.01)
*G01B 7/30* (2006.01)
(Continued)

(52) U.S. Cl.
CPC ......... *F16H 59/105* (2013.01); *F16H 59/044* (2013.01); *G01B 7/30* (2013.01); *F16H 2059/0269* (2013.01)

(58) Field of Classification Search
CPC ................. F16H 59/105; F16H 59/044; F16H 2059/0269; G01B 7/30
See application file for complete search history.

(56) References Cited

U.S. PATENT DOCUMENTS 4,926,172 A * 5/1990 Gorsek ................ F16H 59/044
200/5 A
7,293,480 B2 * 11/2007 Matsui .................. F16H 59/105
74/471 XY (Continued)

FOREIGN PATENT DOCUMENTS

DE 112013001757 T5 * 2/2015 ............. G01D 5/145
JP 2008-520484 A 6/2008
(Continued)

*Primary Examiner* — Jake Cook
*Assistant Examiner* — Gregory Robert Weber
(74) *Attorney, Agent, or Firm* — Roberts Calderon Safran & Cole P.C.

(57) ABSTRACT

In a shift device, the placement of magnets relative to sensors can be changed by rotating a ball shaft of a lever. The sensors detect magnetic fields generated by the magnets in order to detect a shift position of the lever. Shields suppress a magnetic field outside the ball shaft from reaching the sensors. The magnets, the sensors, and the shields are disposed on the ball shaft. This enables a reduction in the size of the shift device.

16 Claims, 7 Drawing Sheets

(51) Int. Cl.
*F16H 59/10* (2006.01)
*F16H 59/02* (2006.01)

(56) References Cited

U.S. PATENT DOCUMENTS

| | | | |
|---|---|---|---|
| 8,261,630 B2* | 9/2012 | Bak | F16H 59/044 |
| | | | 74/473.12 |
| 8,570,051 B2* | 10/2013 | Iwasaki | G01B 7/003 |
| | | | 324/649 |
| 10,527,158 B1* | 1/2020 | Wagner | F16H 59/105 |
| 2004/0164731 A1* | 8/2004 | Moreno | G01D 5/147 |
| | | | 324/207.22 |
| 2008/0078604 A1 | 4/2008 | Ersoy et al. | |

FOREIGN PATENT DOCUMENTS

| | | |
|---|---|---|
| JP | 2012-002716 A | 1/2012 |
| JP | 2013-228371 A | 11/2013 |

\* cited by examiner

SHIFT DEVICE

CROSS-REFERENCE TO RELATED APPLICATIONS

The present application is a U.S. National Phase of PCT/JP2018/031782 filed on Aug. 28, 2018, claiming priority under 35 USC 119 from Japanese Patent Application No. 2017-175427 filed Sep. 13, 2017, the disclosure of which is incorporated by reference herein.

TECHNICAL FIELD

The present invention relates to a shift device in which a shift position of a shift body is changed by rotating a rotation shaft of the shift body.

BACKGROUND ART

Japanese National-Phase Publication No. 2008-520484 describes a select lever device in which housing of a select lever is rotated to change a shift position of the select lever.

The housing is supported on a joint ball. A magnetic field generated by a permanent magnet on the joint ball is detected by a sensor assembly in the housing in order to detect the shift position of the select lever.

In such select lever devices, it would be preferable to reduce the size of the select lever device in cases in which a magnetic field outside the housing are suppressed from reaching the sensor assembly.

SUMMARY OF INVENTION

Technical Problem

In consideration of the above circumstances, an object of the present invention is to obtain a shift device capable of achieving a reduction in size even in cases in which a magnetic field outside a rotation shaft are suppressed from reaching a detection section.

Solution to Problem

A shift device of a first aspect of the present invention includes a shift body that is provided with a rotation shaft and that is configured to change shift position when the rotation shaft is rotated, a generation section that is disposed at the rotation shaft and that generates a magnetic field, a detection section that is disposed at the rotation shaft, that has a changeable placement relative to the generation section when the rotation shaft is rotated, and that is configured to detect the shift position of the shift body by detecting the magnetic field generated by the generation section, and a suppressing section that is disposed at the rotation shaft, and that suppresses a magnetic field outside the rotation shaft from reaching the detection section.

A shift device of a second aspect of the present invention is the shift device of the first aspect of the present invention, wherein the suppressing section covers an apex face side and a side face side of the detection section.

A shift device of a third aspect of the present invention is the shift device of either the first aspect or the second aspect of the present invention, wherein the generation section is present facing across the detection section.

A shift device of a fourth aspect of the present invention is the shift device of any one of the first aspect to the third aspect of the present invention, further including a retention section that is provided at the rotation shaft, that retains the generation section at the rotation shaft, and that does not contact the suppressing section.

A shift device of a fifth aspect of the present invention is the shift device of any one of the first aspect to the fourth aspect of the present invention, wherein the suppressing section is disposed around an entirety of the generation section in a peripheral direction of the generation section.

A shift device of a sixth aspect of the present invention is the shift device of any one of the first aspect to the fifth aspect of the present invention, wherein the suppressing section is disposed on both sides of the detection section.

Advantageous Effects of Invention

In the shift device of the first aspect of the present invention, the rotation shaft of the shift body is rotated to change the shift position of the shift body. Moreover, since the placement of the detection section relative to the generation section can be changed by rotating the rotation shaft, the magnetic field generated by the generation section is detected by the detection section in order to detect the shift position of the shift body. The suppressing section suppresses a magnetic field outside the rotation shaft from reaching the detection section.

Note that the generation section, the detection section, and the suppressing section are disposed at the rotation shaft. This enables a reduction in the size of the shift device even when a magnetic field outside the rotation shaft is suppressed from reaching the detection section.

In the shift device of the second aspect of the present invention, the suppressing section covers the apex face side and the side face side of the detection section. The suppressing section is thus capable of effectively suppressing a magnetic field outside the rotation shaft from reaching the detection section.

In the shift device of the third aspect of the present invention, the generation section is present facing across the detection section. Accordingly, the magnetic field generated by the generation section can be magnified at the position of the detection section, thereby enabling the precision with which the magnetic field generated by the generation section is detected by the detection section to be raised.

In the shift device of the fourth aspect of the present invention, the retention section of the rotation shaft retains the generation section at the rotation shaft.

Note that the retention section does not contact the suppressing section. This enables the dimensional precision demanded of the suppressing section to be lowered.

In the shift device of the fifth aspect of the present invention, the suppressing section is disposed around the entire generation section in the peripheral direction of the generation section. The suppressing section is thus capable of effectively suppressing a magnetic field outside the rotation shaft from reaching the detection section.

In the shift device of the sixth aspect of the present invention, the suppressing section is disposed on both sides of the detection section. The suppressing section is thus capable of effectively suppressing a magnetic field outside the rotation shaft from reaching the detection section.

DESCRIPTION OF EMBODIMENTS

Figure 1:
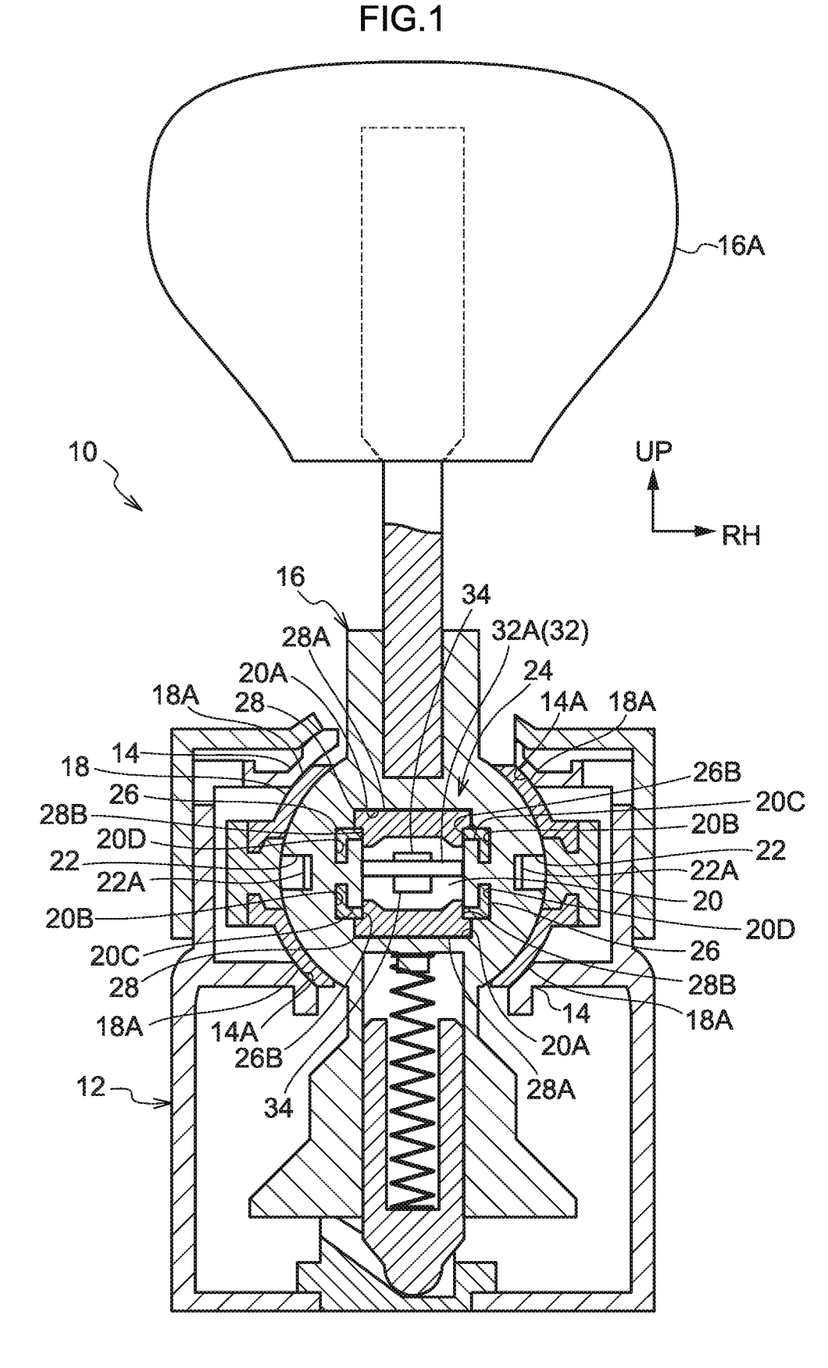
FIG. 1 is a cross-section illustrating a shift device according to an exemplary embodiment of the present invention as viewed from the rear.
Figure 2:
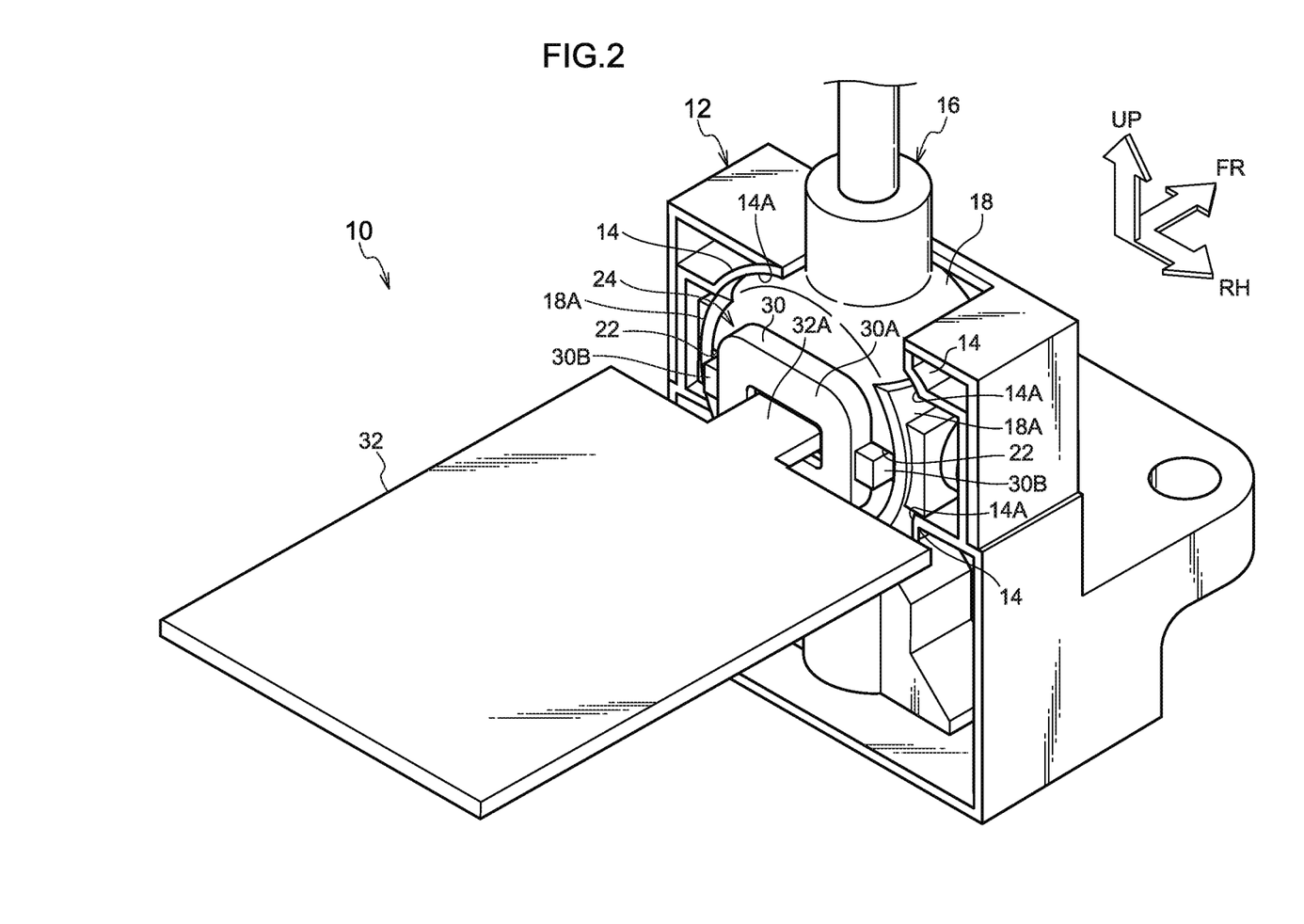
FIG. 2 is a perspective view illustrating a shift device according to an exemplary embodiment of the present invention as viewed obliquely from the rear right.
Figure 3:
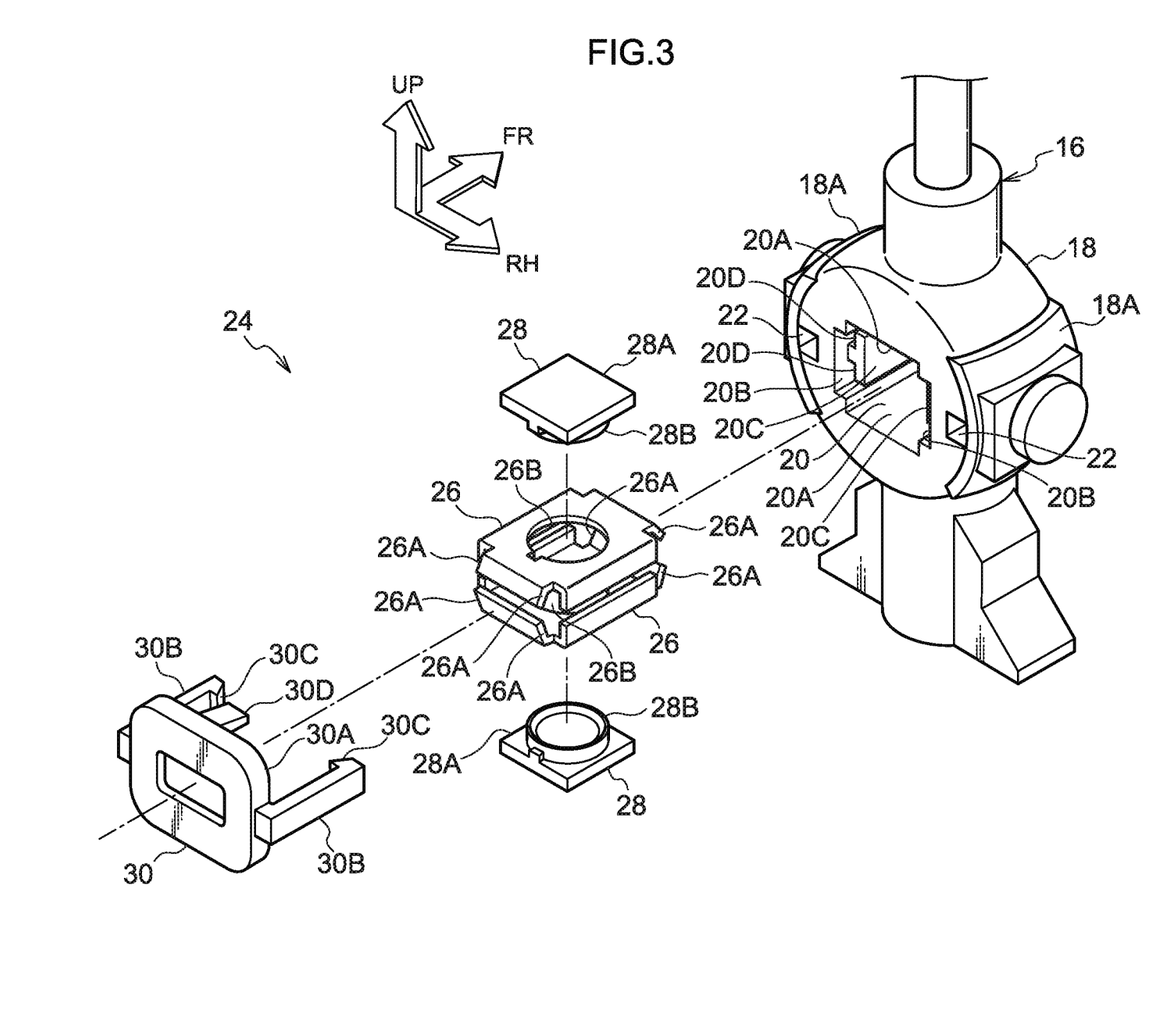
FIG. 3 is an exploded perspective view illustrating a lever of a shift device according to an exemplary embodiment of the present invention as viewed obliquely from the rear right.
Figure 4A:
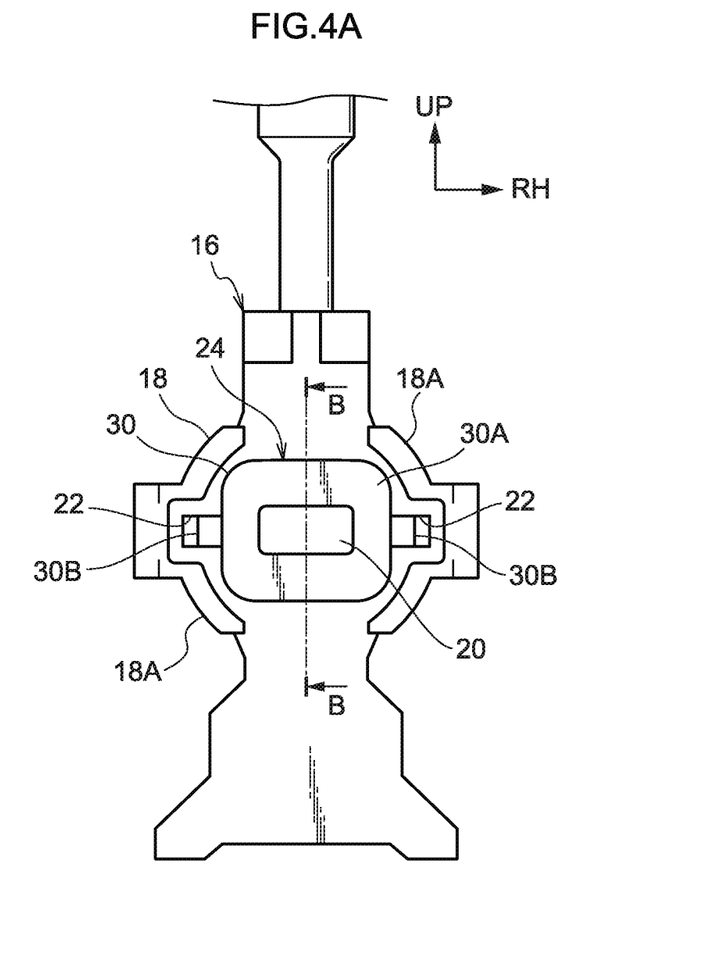
FIG. 4A is a front view illustrating a lever of a shift device according to an exemplary embodiment of the present invention, as viewed from the front.
Figure 4B:
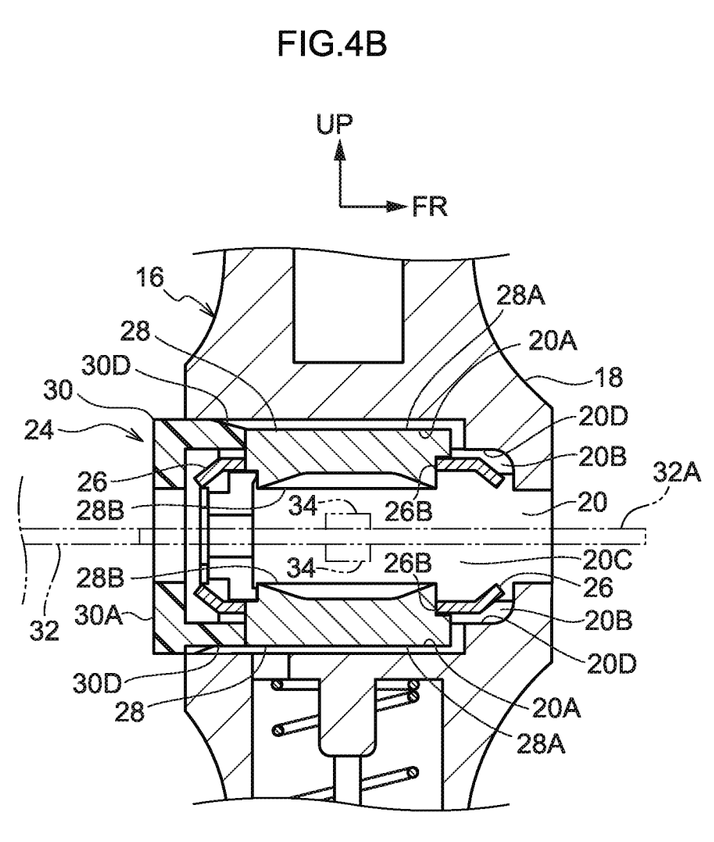
FIG. 4B is a cross-section illustrating a lever of a shift device according to an exemplary embodiment of the present invention, as viewed from the right.
Figure 5A:
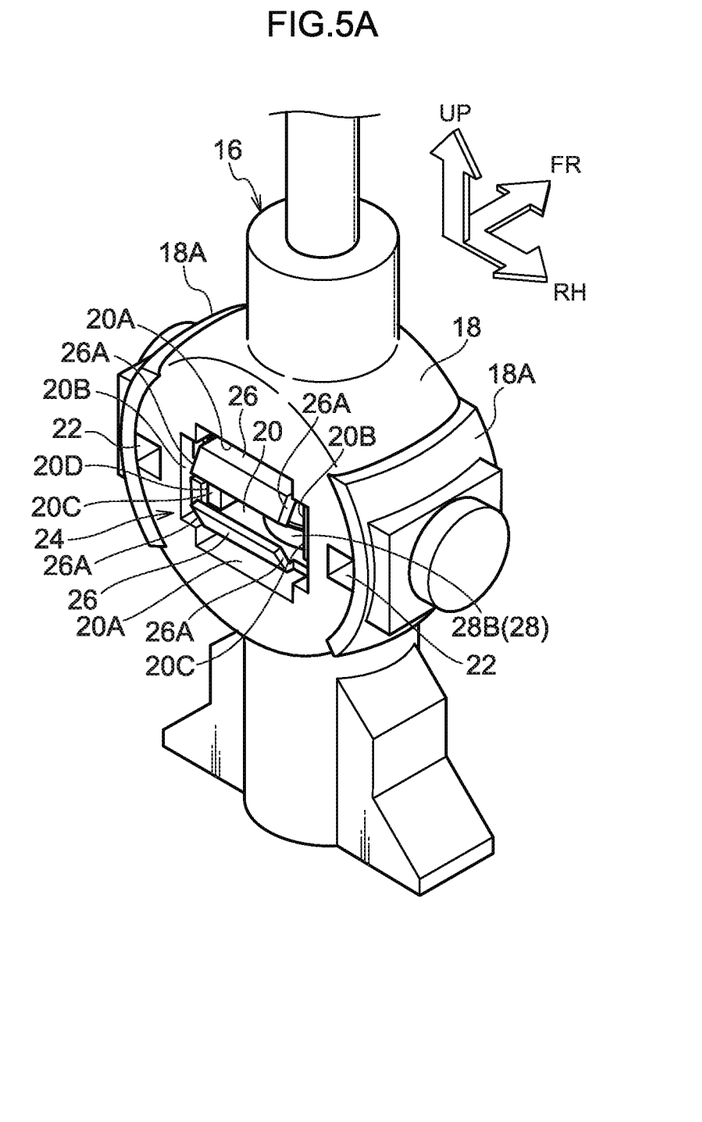
FIG. 5A is a perspective view illustrating a lever of a shift device according to an exemplary embodiment of the present invention, as viewed obliquely from the rear right in a state in which a cap is not attached to the lever.
Figure 5B:
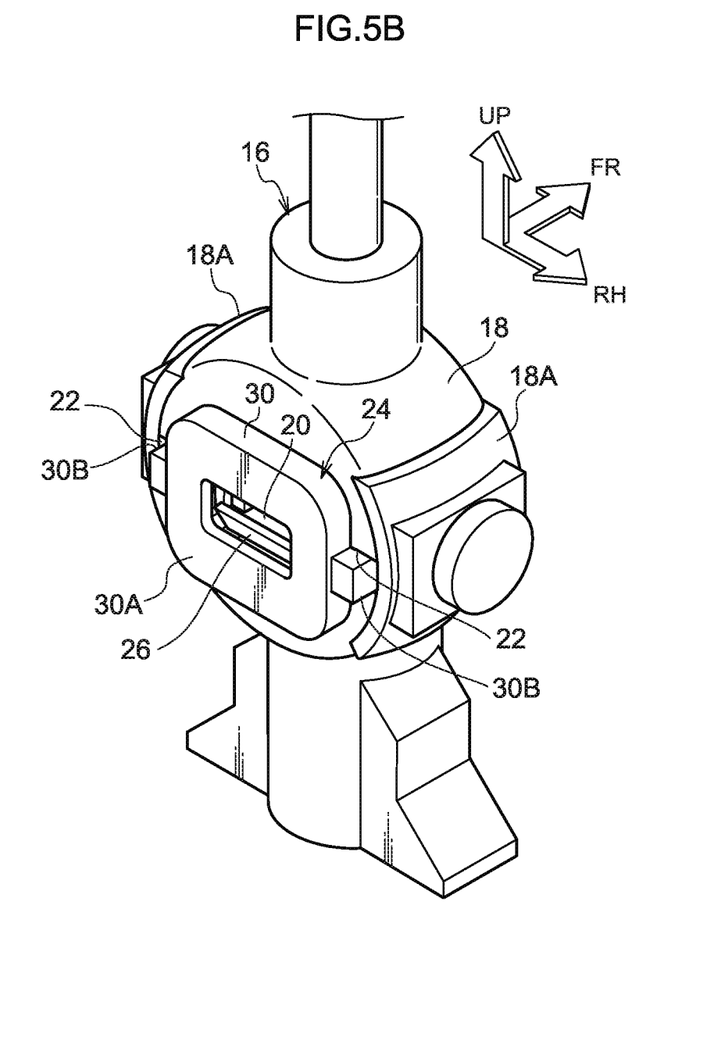
FIG. 5B is a perspective view illustrating a lever of a shift device according to an exemplary embodiment of the present invention, as viewed obliquely from the rear right in a state in which a cap has been attached to the lever.

FIG. 1 is a cross-section illustrating a shift device 10 according to an exemplary embodiment of the present invention, as viewed from the rear. FIG. 2 is a perspective view illustrating the shift device 10 as viewed obliquely from the rear right. In the drawings, the arrow FR points forward from the shift device 10, the arrow RH points toward the right from the shift device 10, and the arrow UP points upward from the shift device 10.

The shift device 10 according to the present exemplary embodiment is floor-mounted, and is installed at a vehicle width direction central portion of a floor section (vehicle body side) of a vehicle cabin of a vehicle (automobile). The forward, left, and upward directions of the shift device 10 are respectively aligned with forward, left, and upward directions of the vehicle.

As illustrated in FIG. 1 and FIG. 2, the shift device 10 is provided with a substantially rectangular box shaped plate 12. The plate 12 is made from resin and serves as an installed body (note that only a front side portion of the plate 12 is illustrated in FIG. 1 and FIG. 2). The plate 12 is installed (fixed) to the floor section of the vehicle cabin.

A shaft bearing 14 with a substantially spherical wall shape and serving as a support portion is provided at an upper front side portion within the plate 12. The shaft bearing 14 is divided into a vehicle upper side-vehicle left side portion, a vehicle upper side-vehicle right side portion, a vehicle lower side-vehicle left side portion, and a vehicle lower side-vehicle right side portion, and spherical face shaped support faces 14A are formed at an inner periphery of the shaft bearing 14.

A lever 16 is provided inside the plate 12. The lever 16 is made of resin, has an elongated substantially columnar shape, and serves as a shift body. The lever 16 extends along the up-down direction. An up-down direction (length direction) intermediate portion of the lever 16 is formed with a substantially spherical ball shaft 18, serving as a rotation shaft. A spherical face shaped rotation face 18A is formed at an outer periphery of the ball shaft 18. The rotation face 18A fits together with the support faces 14A of the shaft bearing 14, such that the ball shaft 18 is rotatably supported by the shaft bearing 14. The lever 16 extends upward from the plate 12 so as to be capable of pivoting, and an upper end portion (length direction leading end portion) of the lever 16 is provided with a knob 16A, serving as an operation portion. The knob 16A is disposed in the vehicle cabin. The knob 16A is gripped by an occupant of the vehicle in order to pivot operate the lever 16 within a predetermined range in both the front-rear direction and the left-right direction, thus rotating the ball shaft 18 in the front-rear direction and the left-right direction in order to change a shift position of the lever 16.

A placement hole 20 is formed in the ball shaft 18 of the lever 16. The placement hole 20 has a substantially rectangular column shape and serves as a placement portion. The placement hole 20 penetrates the ball shaft 18 along the front-rear direction, and the front-rear direction, left-right direction, and up-down direction center of the placement hole 20 is disposed at the center of the ball shaft 18 (the center of the rotation face 18A). Magnet holes 20A are formed at an upper end portion and a lower end portion of the placement hole 20. Each of the magnet holes 20A has a substantially rectangular column shape and serves as a generation hole. Each of the magnet holes 20A opens toward the inside and toward the rear side of the placement hole 20. Shield holes 20B are formed at a left end portion and a right end portion of the placement hole 20. Each of the shield holes 20B has a substantially rectangular column shape and serves as a suppressing hole. Each of the shield holes 20B opens toward the inside and toward the rear side of the placement hole 20. An insertion frame 20C is formed inside each of the shield holes 20B. Each of the insertion frames 20C has a substantially T-shaped columnar cross-section profile, extends along the front-rear direction, and serves as a frame portion. A base end portion of each of the insertion frames 20C is integrated to an up-down direction central portion of a face of the corresponding shield hole 20B at the outside of the placement hole 20, and a leading end portion of each of the insertion frames 20C extends both upward and downward. Insertion holes 20D are formed at an upper side portion and a lower side portion of each of the shield holes 20B. The respective insertion holes 20D are configured by an upper side portion or a lower side portion of the corresponding insertion frame 20C. Each of the insertion holes 20D has a substantially L-shaped cross-section profile and serves as an insertion portion.

The ball shaft 18 of the lever 16 is formed with rectangular column shaped engagement holes 22 on the right side and the left side of the placement hole 20. Each of the engagement holes 22 extends along the front-rear direction and is open toward the rear side. A front side portion of a face on the placement hole 20 side of each engagement hole 22 is formed with an engagement protrusion 22A. A front face of each of the engagement protrusions 22A is disposed perpendicularly to the front-rear direction.

The ball shaft 18 of the lever 16 is provided with a detection mechanism 24 (see FIG. 3, FIG. 4A, FIG. 4B, FIG. 5A, and FIG. 5B).

Shields 26 are provided at both an upper side and a lower side of the detection mechanism 24. Each of the shields 26 is made of metal (for example iron), has a substantially rectangular box shape, and serves as a suppressing section. Interiors of the upper side and lower side shields 26 open toward the lower side and the upper side respectively. Both left-right direction end portions of a front wall and a rear wall of each of the shields 26 are formed with insertion holes 26A. The upper side and lower side shields 26 are inserted into the placement hole 20 in the ball shaft 18 from the rear side, such that an upper side portion and a lower side portion of the leading end portions of the respective insertion frames 20C of the placement hole 20 are inserted through the respective insertion holes 26A on the front sides of the upper side and lower side shields 26. Both left-right direction end portions of the upper side and lower side shields 26 are thus inserted into the upper side and lower side insertion holes 20D of the placement hole 20, and left-right direction intermediate portions of the upper side and lower side shields 26 are inserted into the placement hole 20 further toward the inside of the placement hole 20 than the upper side and lower side magnet holes 20A. A base wall of each of the shields 26 (an upper wall of the upper side shield 26 and a lower wall of the lower side shield 26) is penetrated by a substantially circular through hole 26B. The through holes 26B are disposed coaxially with the base walls of the shields 26.

Magnets 28, serving as generation sections, are provided at the upper side and lower side of the detection mechanism 24. The upper side and lower side magnets 28 are respectively inserted into the placement hole 20 in the ball shaft 18 from the rear side, together with the upper side and lower side shields 26. Each of the magnets 28 is provided with a rectangular plate shaped magnet plate 28A. Each of the magnet plates 28A is fitted into the corresponding magnet hole 20A of the placement hole 20, such that the magnet plates 28A are disposed at outer side of the placement hole 20 relative to the respective shields 26. A substantially circular column shaped magnet column 28B is integrally provided on the placement hole 20 inner side of each of the magnet plates 28A. The magnet columns 28B are disposed coaxially to the magnet plates 28A, and are inserted through and fitted together with the corresponding through holes 26B in the shields 26 in a rotation-anchored state. The magnet plates 28A of the upper side and lower side magnets 28 and the base walls of the respective shields 26 are each clamped between a face on the placement hole 20 outside of the corresponding upper side or lower side magnet hole 20A and upper ends or lower ends of the leading end portions of the respective insertion frames 20C of the placement hole 20, such that the upper side and lower side shields 26 and magnets 28 are press-fitted in the placement hole 20. The N pole of the upper side magnet 28 is located on the upper side and the S pole of the upper side magnet 28 is located on the lower side thereof. The N pole of the lower side magnet 28 is located on the upper side and the S pole of the lower side magnet 28 is located on the lower side thereof.

A cap 30 is provided at a rear side of the detection mechanism 24. The cap 30 is made of resin and serves as a retention section. The cap 30 is provided with a substantially rectangular ring shaped cap body 30A. Engagement claws 30B are integrally provided to a left end portion and a right end portion of the cap body 30A. Each of the engagement claws 30B extends toward the front side. Leading ends (front ends) of the engagement claws 30B are formed with claw portions 30C. Each of the claw portions 30C has a right-angled triangle shaped cross-section profile. The engagement claws 30B are inserted into the engagement holes 22 in the ball shaft 18 from the rear side. The claw portions 30C engage with the engagement protrusions 22A of the engagement holes 22 from the front side due to the engagement claws 30B elastically deforming. The engagement claws 30B are thus suppressed from separating from the ball shaft 18, thereby attaching the cap 30 to the ball shaft 18 with the cap body 30A abutting the periphery of the placement hole 20 in the ball shaft 18 from the rear side. Pressing columns 30D are integrally provided to an upper end portion and a lower end portion of the cap body 30A at left-right direction central portions of the cap body 30A. Each of the pressing columns 30D has a substantially rectangular column shape and serves as a pressing portion. The upper side and lower side pressing columns 30D press the magnet plates 28A of the upper side and lower side magnets 28 from the rear side. Movement of the magnets 28 in the front-rear direction is thus suppressed, such that the magnets 28 and the shields 26 are retained in the ball shaft 18.

A sensor substrate 32, serving as a detection body, is provided at the rear side of the ball shaft 18 of the lever 16. The sensor substrate 32 is fixed inside a rear side portion of the plate 12, and is disposed perpendicular to the up-down direction. A front portion of the sensor substrate 32 is provided with a rectangular plate shaped extension portion 32A. The extension portion 32A extends toward the front side, and passes to the inside of the cap body 30A of the cap 30 and through the placement hole 20 in the ball shaft 18. An upper face and a lower face of the extension portion 32A are each provided with a sensor 34 (for example a 3D Hall sensor), serving as a detection section configuring the detection mechanism 24. The upper side and lower side sensors 34 are present facing across the extension portion 32A, and are disposed coaxially to the upper side and lower side magnets 28. Note that when the lever 16 is pivot operated and the ball shaft 18 rotates, a peripheral face of the placement hole 20 in the ball shaft 18, the shields 26, the magnets 28, and the cap 30 do not abut the extension portion 32A nor the magnets 28.

Next, explanation follows regarding operation of the present exemplary embodiment.

In the shift device 10 configured as described above, the lever 16 is pivoted and the ball shaft 18 of the lever 16 rotates to change the shift position of the lever 16. Since the placement of the magnets 28 relative to the sensors 34 on the sensor substrate 32 can be changed by rotating the ball shaft 18, the magnetic fields generated by the magnets 28 are detected by the sensors 34 in order to detect the shift position of the lever 16. Magnetic fields (magnetic fields from external sources) outside the ball shaft 18 (outside the plate 12 in particular) are suppressed from reaching the sensors 34 by the shields 26. Accordingly, the precision with which the magnetic fields generated by the magnets 28 are detected by the sensors 34 is raised, thus raising the precision with which the shift position of the lever 16 is detected.

Note that the magnets 28, the sensors 34, and the shields 26 are disposed at the ball shaft 18. Accordingly, there is no need to cover the outside of the plate 12 with the shields 26, even in order to suppress a magnetic field outside the ball shaft 18 from reaching the sensor 34, thereby enabling a reduction in the size of the shift device 10. Moreover, providing the magnets 28 on the ball shaft 18 enables the need to provide a separate member to transmit the pivoting of the lever 16 to the magnets 28 to be eliminated, thus enabling a simpler configuration, enabling a further reduction in the size of the shift device 10, and enabling a reduction in the cost of the shift device 10.

The shields 26 are provided with base walls and side walls, such that the shields 26 cover the respective sensors 34 from both an apex face side and side face sides. The shields 26 are thus capable of effectively suppressing a magnetic field outside the ball shaft 18 from reaching the sensors 34.

Moreover, the shields 26 are disposed around the entirety of the magnets 28 in a peripheral direction of the magnets 28. The shields 26 are thus capable of effectively suppressing a magnetic field outside the ball shaft 18 from reaching the sensors 34.

The shields 26 are disposed both at the upper side and lower side of the sensors 34. The pair of shields 26 are thus capable of effectively suppressing a magnetic field outside the ball shaft 18 from reaching the sensors 34.

The pair of magnets 28 are present facing across the sensors 34. Accordingly, the magnetic fields generated by the pair of magnets 28 can be magnified at the positions of the sensors 34, thereby enabling the precision with which the magnetic fields generated by the pair of magnets 28 are detected by the sensors 34 to be raised, and thus enabling the precision with which the shift position of the lever 16 is detected to be effectively raised.

The pressing column 30D of the cap 30 contacts the magnets 28; however the cap 30 does not contact the shields 26. Accordingly, there is no need to configure the shields 26 with precise dimensions corresponding to the dimensions of the cap 30, enabling the dimensional precision demanded of the shields 26 to be lowered.

Note that in the present exemplary embodiment, the magnets 28 and the shields 26 are retained in the ball shaft 18 by the cap 30. However, insert molding may be used to retain the magnets 28 and the shields 26 in the ball shaft 18.

In the present exemplary embodiment, the rotation shaft is configured by the substantially spherical ball shaft 18 of the lever 16. However, the rotation shaft may be any portion of the lever 16 that is rotatably supported, and for example the rotation shaft may have a circular column shape.

In the present exemplary embodiment, the magnet plates 28A and the magnet columns 28B of the magnets 28 are both magnetized. However, configuration may be made in which the magnet columns 28B are magnetized and the magnet plates 28A are not magnetized. For example, magnet plates 28A made of resin may be integrated to magnetized magnet columns 28B by being assembled or insert molded thereto.

Moreover, in the present exemplary embodiment the magnets 28, the sensors 34, and the shields 26 are each provided in sets of two. However, one, or three or more, of at least one configuration element out of the magnets 28, the sensors 34, and the shields 26 may be provided. For example, instead of a configuration in which the shift position of the lever 16 is determined by combining the outputs of plural ON/OFF sensors (detection sections), the present invention may be applied to a configuration in which a single magnet (generation section) is employed to determine the shift position of the lever 16 by changing a magnetization mode on the sensor (detection section) side of the single magnet (generation section) such that an output result of the sensor (detection section) changes according to each shift position of the lever 16. Moreover, for example, the two shields 26 may be integrated together.

Moreover, in the present exemplary embodiment, the shift device 10 is a floor-type shift device installed to the floor section of the vehicle cabin. However, the shift device 10 may be installed to an instrument panel or a steering column in the vehicle cabin.

The disclosure of Japanese Patent Application No. 2017-175427, filed on Sep. 13, 2017, is incorporated in its entirety by reference herein.

The invention claimed is:

1. A shift device comprising:
   a shift body that is provided with a rotation shaft, and that is configured to change shift position when the rotation shaft is rotated;
   an installed body that has a support portion supporting the rotation shaft;
   a generation section that is fixed at the rotation shaft, and that generates a magnetic field;
   a detection section that is fixed at a side of the installed body and that is disposed at the rotation shaft, that has a changeable placement relative to the generation section when the rotation shaft is rotated, and that is configured to detect the shift position of the shift body by detecting the magnetic field generated by the generation section; and
   a suppressing section that is fixed at the rotation shaft, and that suppresses a magnetic field outside the rotation shaft from reaching the detection section,
   wherein a base wall portion of the suppressing section fixed at the rotation shaft is disposed at an apex face side of the detection section and a side wall portion of the suppressing section fixed at the rotation shaft is disposed at a side face side of the detection section, and
   wherein the suppressing section fixed at the rotation shaft covers the apex face side and the side face side of the detection section.

2. The shift device of claim 1, wherein the generation section includes generation portions, and the generation portions are disposed facing each other such that the detection section is disposed between the generation portions.

3. The shift device of claim 1, further comprising a retention section that is provided at the rotation shaft, that retains the generation section at the rotation shaft, and that does not contact the suppressing section.

4. The shift device of claim 1, wherein the suppressing section is disposed around an entirety of the generation section in a peripheral direction of the generation section.

5. The shift device of claim 1, wherein the suppressing section includes a first suppressing portion and a second suppressing portion which are disposed on both sides of the detection section.

6. The shift device of claim 1, wherein the suppressing section includes a first suppressing portion fixed at the rotation shaft and a second suppressing portion fixed at the rotation shaft, and the detection section is disposed at a space between the first suppressing portion and the second suppressing portion.

7. The shift device of claim 1, wherein the rotation shaft is a substantially spherical ball shaft, which has a spherical face shaped rotation face and which is configured to rotate in a vehicle front-rear direction and in a vehicle left-right direction, the rotation face is supported at a spherical face shaped support face formed at the support portion, and the generation section and the suppressing section are fixed in a hole formed in the rotation shaft, and the detection section is disposed in the hole.

8. The shift device of claim 1, wherein the suppressing section fixed at the rotation shaft has a substantially box shape.

9. A shift device comprising:
   a shift body that is provided with a rotation shaft, and that is configured to change shift position when the rotation shaft is rotated;
   an installed body that has a support portion supporting the rotation shaft;
   a generation section that is fixed at the rotation shaft, and that generates a magnetic field;
   a detection section that is fixed at a side of the installed body and that is disposed at the rotation shaft, that has a changeable placement relative to the generation section when the rotation shaft is rotated, and that is configured to detect the shift position of the shift body by detecting the magnetic field generated by the generation section; and
   a suppressing section that is fixed at the rotation shaft, and that suppresses a magnetic field outside the rotation shaft from reaching the detection section, wherein the suppressing section includes a first suppressing portion fixed at the rotation shaft and a second suppressing portion fixed at the rotation shaft, and the detection section is disposed at a space between the first suppressing portion and the second suppressing portion, and wherein the suppressing section fixed at the rotation shaft covers an apex face side and a side face side of the detection section.

10. The shift device of claim 9, wherein the generation section includes generation portions, and the generation portions are disposed facing each other such that the detection section is disposed between the generation portions.

11. The shift device of claim 9, further comprising a retention section that is provided at the rotation shaft, that retains the generation section at the rotation shaft, and that does not contact the suppressing section.

12. The shift device of claim 9, wherein the suppressing section is disposed around an entirety of the generation section in a peripheral direction of the generation section.

13. The shift device of claim 9, wherein the first suppressing portion and the second suppressing portion are disposed on both sides of the detection section.

14. The shift device of claim 9, wherein base wall portions of the first suppressing portion and the second suppressing portion fixed at the rotation shaft are disposed at apex face sides of the detection section and side wall portions of the first suppressing portion and the second suppressing portion fixed at the rotation shaft are disposed at the side face side of the detection section.

15. The shift device of claim 9, wherein the rotation shaft is a substantially spherical ball shaft, which has a spherical face shaped rotation face and which is configured to rotate in a vehicle front-rear direction and in a vehicle left-right direction, the rotation face is supported at a spherical face shaped support face formed at the support portion, and the generation section and the first suppressing portion and the second suppressing portion are fixed in a hole formed in the rotation shaft, and the detection section is disposed in the hole.

16. The shift device of claim 9, wherein the first suppressing portion fixed at the rotation shaft and the second suppressing portion fixed at the rotation shaft have substantially box shape opening toward the detection section.

* * * * *